(12) United States Patent
Gallagher

(10) Patent No.: US 8,787,283 B2
(45) Date of Patent: Jul. 22, 2014

(54) METHOD AND SYSTEM FOR PROVIDING REDUCED BANDWIDTH ACQUISITION LATENCY

(75) Inventor: Timothy Gallagher, Encinitas, CA (US)

(73) Assignee: Maxlinear, Inc., Carlsbad, CA (US)

(*) Notice: Subject to any disclaimer, the term of this patent is extended or adjusted under 35 U.S.C. 154(b) by 230 days.

(21) Appl. No.: 13/301,452

(22) Filed: Nov. 21, 2011

(65) Prior Publication Data
US 2013/0128825 A1    May 23, 2013

(51) Int. Cl.
*H04W 4/00* (2009.01)
(52) U.S. Cl.
USPC ........... 370/329; 370/352; 370/353; 370/354; 370/355; 370/356; 370/338; 370/254; 370/400; 370/401
(58) Field of Classification Search
None
See application file for complete search history.

(56) References Cited

U.S. PATENT DOCUMENTS

| 2009/0310516 | A1* | 12/2009 | Goel et al. | 370/254 |
|---|---|---|---|---|
| 2010/0158022 | A1* | 6/2010 | Kliger et al. | 370/400 |
| 2011/0162013 | A1* | 6/2011 | Bagasra et al. | 725/74 |
| 2011/0317584 | A1* | 12/2011 | Wu | 370/254 |

* cited by examiner

*Primary Examiner* — Ian N Moore
*Assistant Examiner* — Eric H Wang
(74) *Attorney, Agent, or Firm* — McAndrews, Held & Malloy

(57) ABSTRACT

Methods and systems for providing reduced bandwidth acquisition latency may comprise communicating a reservation request for bandwidth allocation for devices operating under a wired network protocol, where the reservation request may be sent by wired network devices via a wireless network protocol over a wireless network. Bandwidth may be allocated in the wired network for the requesting devices by a network controller. Data may be communicated with the requesting devices via the wired network. The wired network communication protocol may comprise a multimedia over cable alliance (MoCA) standard. The wireless protocol may comprise an IEEE 802.11x standard, a Bluetooth standard, and/or any non-public network protocol. The communication of the reservation request via the wireless protocol may decrease a latency of the wired network. A medium access plan (MAP) may be generated by the network controller based on the reservation request and may comprise a bandwidth allocation for the requesting devices.

12 Claims, 5 Drawing Sheets

METHOD AND SYSTEM FOR PROVIDING REDUCED BANDWIDTH ACQUISITION LATENCY

FIELD OF THE INVENTION

Certain embodiments of the invention relate to multimedia communication. More specifically, certain embodiments of the invention relate to a method and system for providing reduced bandwidth acquisition latency.

BACKGROUND OF THE INVENTION

Although computer networks have been in existence for decades, they only recently became commonplace in homes. Wired networks over various types of wire and cable as well as wireless networks over consumer wireless routers have been developed for use in residential applications.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for providing reduced bandwidth acquisition latency, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for providing reduced bandwidth acquisition latency. Exemplary aspects of the invention may comprise communicating a reservation request for bandwidth allocation for one or more devices operating under a wired network communication protocol on a wired network, where the reservation request may be sent by one or more requesting wired network devices via a wireless network protocol over a wireless network. Bandwidth may be allocated in the wired network for the one or more requesting wired network devices by a network controller for the wired network. Data may be communicated with the one or more requesting wired network devices via the wired network communication protocol on the wired network. The wired network communication protocol may comprise a multimedia over cable alliance (MoCA) standard. The wireless network communication protocol may comprise an IEEE 802.11x standard, a Bluetooth standard, and/or any non-public wireless network protocol. The communication of the reservation request via the wireless network communication protocol may decrease a latency of the wired network. The communicated data may comprise multimedia data. A medium access plan (MAP) may be generated by the network controller based on the wirelessly communicated reservation request. The MAP may comprise a bandwidth allocation for the one or more requesting wired network devices. The MAP may, for example, comprise information describing bandwidth on the wired network that has been allocated for use by one or more network nodes for one or more respective communications. The network controller may comprise wireless network and wired network capability.

Figure 1:
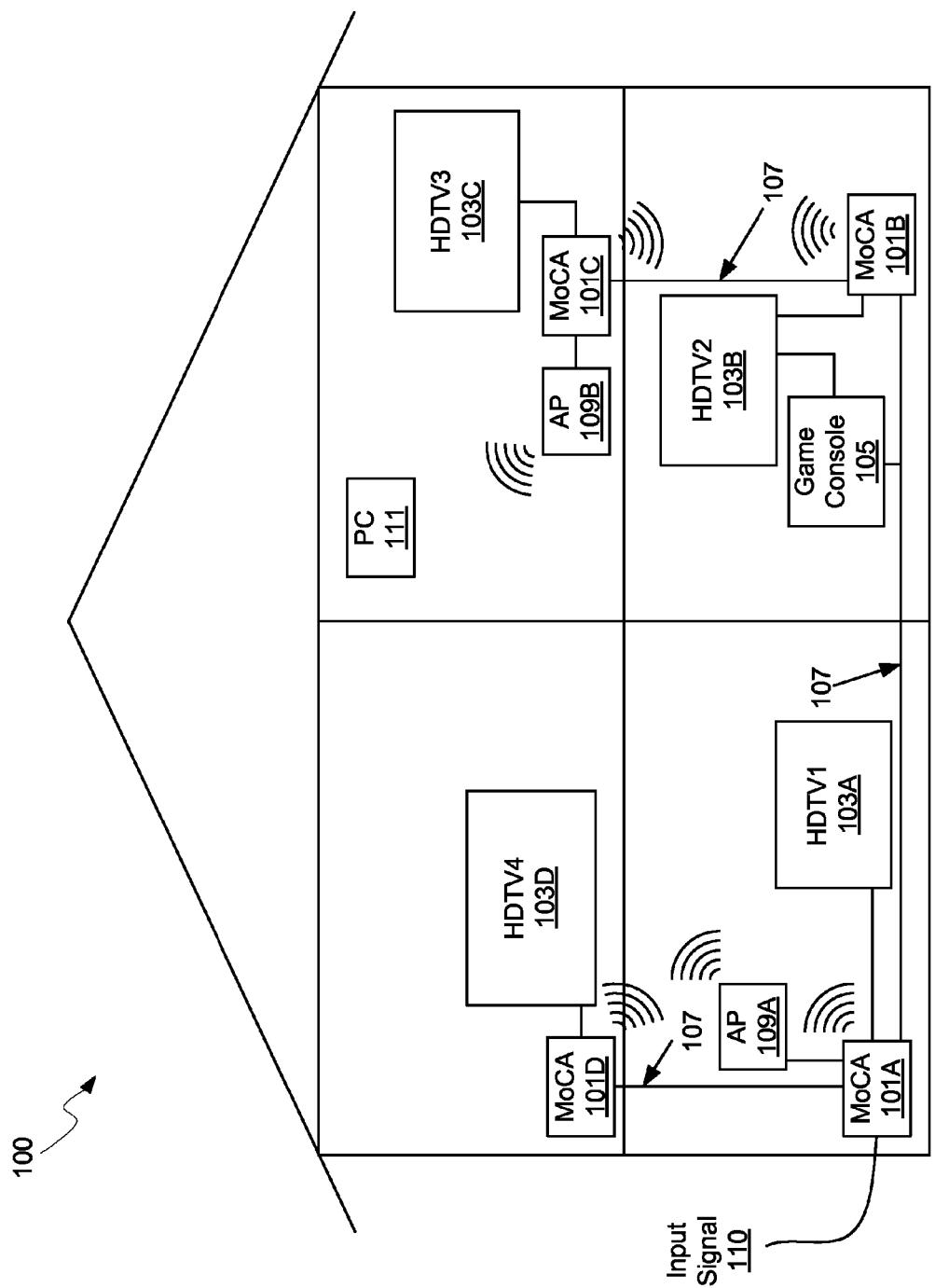
FIG. 1 is a diagram illustrating exemplary dwelling-based networks, in accordance with an embodiment of the invention.

FIG. 1 is a diagram illustrating exemplary dwelling-based networks, in accordance with an embodiment of the invention. Though the following example(s) is generally presented in the context of a dwelling, such discussion readily applies to any of a variety of premises (e.g., a residence, a single-unit dwelling, a multi-unit dwelling, an office, etc.). Accordingly, the scope of various aspects of the present invention should not be limited by characteristics of the exemplary dwelling unless explicitly claimed.

Referring to FIG. 1, there is shown a dwelling-based wired and wireless network 100 spanning a plurality of rooms in the dwelling, where each one may have one or more networked devices. There is also shown Multimedia over Cable Alliance (MoCA) bridges 101A-101D, high-definition televisions (HDTVs) 103A-103D, a game console 105, wireless access points 109A and 109B, a personal computer 111, coaxial cables 107, and an input signal 110, which may be provided by a cable head-end or a satellite signal source, for example.

The MoCA bridges 101A-101D (or general MoCA devices) may comprise network bridges that enable a secure wired network utilizing the coaxial cables 107 in the dwelling wired and wireless network 100. The MoCA bridges 101A-101D may operate under the MoCA 1.x or 2.x specification, for example, and may communicate signals between bridges in a ~1-2 GHz frequency range when operating with a cable TV signal or ~400-900 MHz when operating with a satellite TV signal. Other communication protocols may be utilized on the same coaxial cables 107. One or more of the MoCA bridges 101A-101D may comprise a network controller in the wired network, coordinating the wired network communications as per the MoCA standard. For example, a first of the MoCA bridges 101A-101D may operate as the MoCA network controller, while a second operates as a back-up network controller.

In another exemplary embodiment, one or more of the MoCA bridges 101A-101D may be operable to provide a WLAN network without the need for an access point, such as the access points 109A and 109B. For example, one or more of the MoCA bridges 101A-101D (or general MoCA devices) may have native WLAN capability.

Cable television signals, including DOCSIS signals, may be communicated in the 50 MHz to 1 GHz range, for example. The cable range generally has about 150 6-MHz TV channels, some of which are allocated to DOCSIS, some to digital television, and some to analog television. DOCSIS may, for example, be used to provide Internet access to the cable subscriber. In various exemplary scenarios, such cable television signals may be present on the wired network 107 (e.g., in their traditional form and/or in a converted form, for example, encapsulated in IP packets being communicated on the wired network 107 in accordance with a MoCA communication protocol).

The access points 109A and 109B may be operable to provide wireless network access to devices within the dwelling-based wired and wireless network 100. Exemplary wireless networks may comprise wireless local area networks (WLANs) that conform to the IEEE 802.11 (e.g., a, g, n, and ac) protocol, femtocells, Bluetooth, ZigBee networks, or any other non-public networks. The access point 109A may be coupled to the MoCA bridge 101A via a wired connection, such as a coaxial cable or an Ethernet cable, for example. Similarly, the access point 109B may be coupled to the MoCA bridge 101C via a wired connection, such as a coaxial cable or an Ethernet cable, for example. In another exemplary embodiment, the MoCA bridges 101A-101D may comprise such wireless capability, including, but not limited to IEEE 802.11 (e.g., a, g, n, and ac) protocol, femtocells, Bluetooth, ZigBee networks, or any other non-public networks.

The coaxial cables 107 may provide variable quality communications channels depending on wire quality, splitters, junctions, or damage to the cables, for example. These variations may be relatively constant and be measured by signal strength or signal to noise ratio, for example. However, the quality of communications over a wireless network, such as that provided by the access point 109 may vary significantly more over shorter periods than wired networks due to RF interference, the amount of traffic, or distance to the receiving device, and may be measured by signal strength, signal to noise ratio, and bit error rate, for example.

In an exemplary embodiment of the invention, one or more of the MoCA bridges 101A-101D that is acting as a MoCA network controller may receive and process reservation requests. The reservation requests may be utilized to request bandwidth for the requesting node.

Under the MoCA 2.0 standard, orthogonal frequency-division multiple access (OFDMA) enables multiple nodes to simultaneously transmit PHY-frames, each utilizing only a subset of subcarriers. The network controller pre-allocates the OFDMA subcarrier subset to nodes on a mutually exclusive basis, with each OFDMA PHY frame containing reservation requests destined solely for the network controller. The requesting nodes are to synchronize their subcarriers to those of the network controller, adjust their transmissions to ensure simultaneous time-of-arrival at the network controller, and adjust the amplitude of their transmissions as specified by the network controller. If these elements are met, the network controller receives a PHY frame with a payload bitstream that is demultiplexed to recover and forward-error-correction (FEC)-decode each individually transmitted reservation request.

In general, MoCA latency (e.g., the time that it takes to acquire communication bandwidth on the MoCA network) may be higher than desired due to the reservation slot requirements of the standard. A node requesting bandwidth must first wait for a reservation slot, then make a request for bandwidth, and then wait to get a medium access plan (MAP), which under the MoCA 2.0 standard takes two MAP cycles, each corresponding to about 1.25 ms latency. Note that in MoCA 2, the latency has been decreased from MoCA 1, because the requesting node must only wait a maximum of two cycles, where eight clients can share a slot, whereas in MoCA 1.x there was no sharing of bandwidth request slots between nodes, so cases could occur that require more than 2 MAP cycles.

In addition to the quality impact, excessive latency may also require devices to buffer information while they wait for bandwidth to be approved and allocated. For example, ideally the application layer should be isolated from the lower communication protocol layers. The application might not know about the latency, leaving the lower layers to manage it.

For example, if the HDTV 103C is requesting streaming HD video via the MoCA network where the MoCA bridge 101A is acting as a network controller, the MoCA bridge 101C (which may, for example, be a stand-alone device or integrated into the HDTV 103C) may send a reservation request to the MoCA bridge 101A, which is acting as the MoCA network controller (NC). However, since the request transmission, reception by the network controller, and reception of the MAP from the network controller may take two MAP cycles, the latency may reduce performance. In an exemplary scenario, the reservation request may be sent wirelessly from the MoCA bridge 101C to the MoCA bridge 101A using a WLAN protocol, such as 802.11x (i.e., any of 802.11a, b, g, n, ac, etc.). While the MoCA network may be relatively slow from a latency point of view, but relatively good from a "guaranteed throughput" point of view, a WLAN is basically the converse. The WLAN may be utilized to overcome the latency of the wired network by providing a low-latency path for reservation requests. For example, a wireless network may be governed by a contention-based medium access protocol in which (particularly in a lightly loaded wireless environment) the reservation requestor can gain immediate access to the wireless medium to communicate a bandwidth reservation request to the wired network controller.

In a multi-pathway example, in a multimedia communication (e.g., an audio/video communication and bandwidth reservation request), a first media (e.g., the audio/video component) may be communicated via a cable medium, and a second media (e.g., reservation requests) may be communicated via a wireless medium. In a further multipath example, in a communication involving the communication of general data information and control information, the general data information may be communicated via a cable medium, and the control information, such as reservation requests, may be communicated via a wireless medium. Note that in such multi-pathway communication may also include the communication of redundant information via each pathway (e.g., critical information, for example bandwidth reservation requests, may be communicated redundantly over both the wired medium and over the wireless medium).

While FIG. 1 shows MoCA and WLAN communications protocols, any network protocol may be applicable, where the network bridge has the capability to communicate via two or more communications protocols. The ability of the network devices to communicate using two or more protocols enables bandwidth reservation requests to be communicated with lower latency. Note that in an exemplary scenario, the wired network (e.g., a MoCA-based network) and the wireless network (e.g., a WLAN) may operate independently, while various devices in the premises are capable of communicating via both of such networks.

Figure 2A:
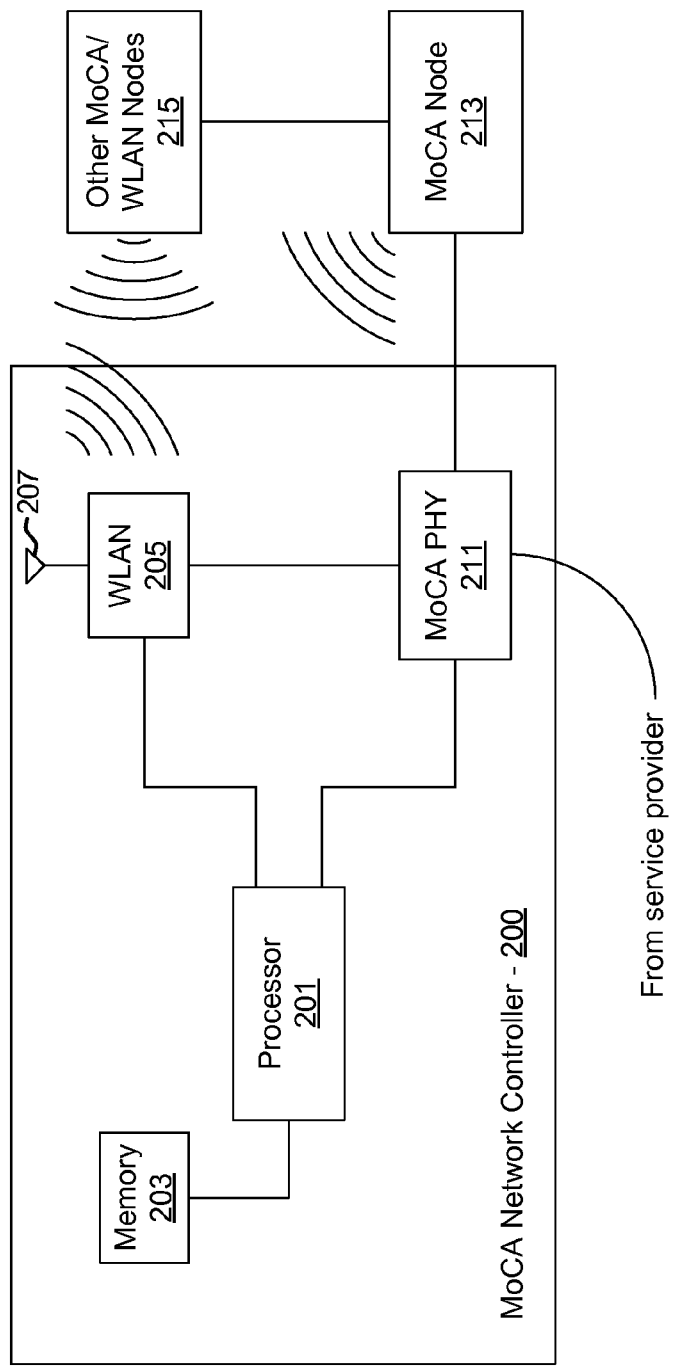
FIG. 2A is a diagram illustrating an exemplary network controller, in accordance with an embodiment of the invention.

FIG. 2A is a diagram illustrating an exemplary network controller, in accordance with an embodiment of the invention. Referring to FIG. 2A, there is shown a network controller 200 comprising a processor 201, a memory 203, a WLAN module 205, one or more WLAN antenna(s) 207, a MoCA PHY 211, a MoCA node 213, and other MoCA/WLAN nodes 215.

The processor 201 may be operable to control the operation of the MoCA network controller 200. For example, the processor 201 may configure the WLAN module 205 to communicate signals at a desired frequency or may configure MoCA channels to be utilized by the MoCA PHY 211. Furthermore, the processor 201 may control the reception and processing of reservation requests from the MoCA node 213 and/or the other MoCA/WLAN nodes 215. In another embodiment of the invention, the processor 201 may be utilized to update and/or modify programmable parameters and/or values in a plurality of components, devices, and/or processing elements. At least a portion of the programmable parameters may be stored in the memory 203.

The WLAN module 205 may be operable to communicate wireless RF signals via the antenna(s) 207 thereby providing wireless network capability to the MoCA network controller 200. WLAN module 205 may be operable to down-convert received RF signals to baseband for processing by the processor 201, and may up-convert baseband signals received from the processor 201 for communication to devices utilizing the WLAN provided by the WLAN module 205.

The MoCA PHY 211 may be operable to communicate signals over coaxial cables, such as the coaxial cables 107, where the signals conform to the MoCA 1.x and/or 2.x standards, to one or more remote MoCA nodes, such as the MoCA node 213. Accordingly, transmissions may be PHY frames scheduled in accordance with the Media Access Control (MAC) Layer specifications, and as such may comprise a PHY preamble and a PHY payload and may apply OFDM modulation. The MoCA network controller 200 may schedule and broadcast specific start and stop times at which transmissions from each node begin and end, and may be communicated in response to reservation requests. Accordingly, the MoCA network controller 200 may be operable to receive and process reservation requests. The reservation requests may be utilized to request bandwidth for the requesting node.

The MoCA node 213 may comprise a generic MoCA device, such as a cable set top box, for example, that may be controlled by the MoCA network controller 200. The MoCA node 213 may be operable to request bandwidth for communication of data signals by sending reservation requests to the MoCA network controller 200. The MoCA node 213 may also have wireless capability for communication of data, and reservation requests. In another exemplary scenario, the MoCA node 213 may be substantially similar to the MoCA network controller 200 with similar capabilities of controlling networking functions of wired and wireless communications in the dwelling wired and wireless network 100. Accordingly, the MoCA node 213 may act as a backup network controller for the MoCA network controller 200.

The other MoCA/WLAN nodes 215 may comprise one or more other nodes or devices that utilize the wired and wireless networks in the dwelling wired and wireless network 100, and may comprise slave nodes that may be controlled by the MoCA network controller 200, and may also be capable of acting as a backup network controller. The controlling nodes may be operable to configure the communications channels used by all devices in the wired and wireless networks. The other MoCA/WLAN nodes may also have wireless capability for data communication and reservation requests.

In operation, the MoCA network controller 200 may direct network traffic to and from a particular device via a combination of the available network media, i.e. over both wired and wireless paths via the MoCA PHY 211 and the WLAN module 205. The MoCA network controller 200 may configure the communications links between all other network nodes within the dwelling wired and wireless network 100.

In an exemplary scenario, one or more MoCA nodes may request bandwidth to communicate data via the MoCA network. Accordingly, the MoCA node 213 may send a reservation request to the MoCA network controller 200. However, since the request transmission, reception by the network controller, and reception of the MAP from the network controller may take at least two MAP cycles, depending on the number of nodes requesting bandwidth, this latency may reduce device performance. In an exemplary scenario, the reservation request may be sent wirelessly from the MoCA node 213 to the MoCA network controller 200 using a WLAN protocol, such as 802.11x. The WLAN may be utilized to overcome the latency of the wired network by providing a low-latency path for reservation requests. The WLAN, or any other low-latency network PHY may be utilized to provide a side channel for requesting a MoCA bandwidth reservation.

In an exemplary scenario, the reservation request may be sent in parallel (e.g., redundantly), via the WLAN protocol and the standard MoCA channel. In such a scenario, redundant reservation requests may be identified as such (e.g., by a bit flag, by a request number, etc.). Thus, the network controller 200, can recognize a redundant reservation request and process such redundant reservation request accordingly (e.g., by discarding a reservation request that is redundant to a previously-received reservation request). In such an exemplary scenario, the redundant requests may essentially race via different respective networks (e.g., via the wireless network and via the wired network) to the attention of the network controller 200.

The use of a parallel channel for communication of reservation requests to the MoCA network controller 200 may guarantee timing (or at least increase the level of certainty of timing) of MAP updates, in that a requesting device may be able to ensure that it is to be allocated bandwidth (if available) as defined in the next MAP update, as opposed to waiting for the network controller to receive and process the request in the standard MoCA MAP cycles. Furthermore, the alternate channel (e.g., WLAN) may also be utilized to return an acknowledgement to the requesting node. For example, the MoCA node 213 may request bandwidth via WLAN. The network controller 200 may configure the subsequent MAP to include the desired bandwidth and send an acknowledgement message to the MoCA node 213 via the WLAN module 205, thereby eliminating the normal MoCA acknowledgement steps. In another scenario, the network controller 200 may return the MAP (or a portion thereof) to the MoCA node 213 wirelessly. In another scenario (e.g., in a scenario in which a wired network MAP was just transmitted on the wired network with unused transmission slots available), the network controller 200 may communicate a message to the MoCA node 213 via the wired network, where such message grants the MoCA node 213 utilization of one or more of such unused transmission slots). In such a scenario, the message may act as a supplemental MAP message, eliminating the need for the MoCA node 213 to wait for the next MAP message. Note that in such a scenario, the network controller 200 may communicate such message to the MoCA node 213 and also one or more other MoCA nodes that will be communicated over the requested bandwidth (e.g., source and destination nodes).

In an exemplary embodiment, the MoCA network controller may be operable to process predictive requests. For example, the MoCA network controller 200 may receive regular requests from a node, and establish that this node requires bandwidth at a regular interval. The MoCA network controller may then establish bandwidth for that particular node in the MAP at a regular interval. This may be established through wireless communication via the WLAN module 205.

While FIG. 2A shows MoCA and WLAN communications protocols, any network protocol may be applicable, where the MoCA network controller 200 has the capability to communicate via and/or knowledge of two or more communications protocols. As a non-limiting example, the wireless network in the previous discussion may be replaced with a power-line network, where the reservation requests for a premises-based cable network may be communicated over a premises-based power-line network. The integration of two or more protocols in the network device and knowledge of channel usage and quality assists with efficient use of the available network media.

Additionally, in a scenario involving premises-based (e.g., home-based) communication networks, the total bandwidth utilized is generally within the control of premises-based devices. For example, communication via a MoCA network is controlled by home-based devices, and communication via a WLAN network is also controlled by home-based devices. Such an operational situation (unlike utilization of public networks) advantageously allows for enhanced optimization of communication bandwidth utilization (e.g., because adverse impacts of unpredictable public utilization of communication bandwidth are generally absent).

Figure 2B:
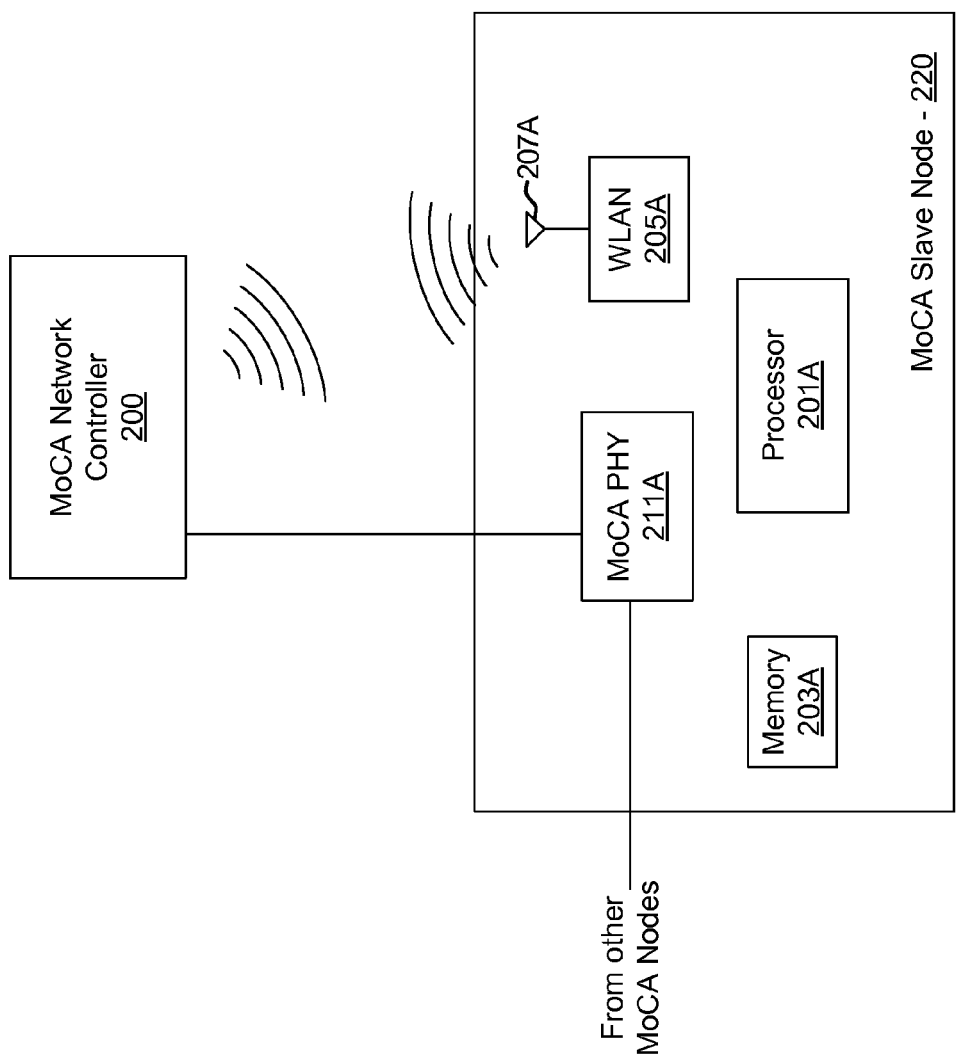
FIG. 2B is a diagram illustrating an exemplary network device, in accordance with an embodiment of the invention.

FIG. 2B is a diagram illustrating an exemplary network device, in accordance with an embodiment of the invention. Referring to FIG. 2B, there is shown the MoCA network controller 200 and a MoCA slave node 220 comprising a processor 201A, a memory 203A, a WLAN module 205A and a MoCA PHY 211A. The processor 201A, the memory 203A, the WLAN module 205A and the MoCA PHY 211A may be substantially similar to the processor 201, the memory 203, the WLAN module 205 and the MoCA PHY 211 described with respect to FIG. 2A, but located within the MoCA slave node 220.

The MoCA slave node 220 may, for example, share any or all characteristics with the MoCA Nodes 213 and 215 discussed previously with regard to FIG. 2A. Also, the MoCA network controller 200 may, for example, share any or all characteristics with the MoCA network controller 200 discussed previously with regard to FIG. 2B.

The MoCA slave node 220 may comprise a networked device such as a MoCA bridge, a set-top box, a personal computer, or a gaming device, and may be controlled (at least in part) by the MoCA network controller 200. For example, the MoCA network controller 200 may configure the bandwidth over which the MoCA slave node 220 may communicate via a MoCA network. The MoCA slave node 220 may request bandwidth to receive data via the MoCA network. Accordingly, the MoCA slave node 220 may send a reservation request to the MoCA network controller 200. However, since the request transmission, reception by the network controller 200, and reception of the MAP from the network controller 220 may take at least two MAP cycles, depending on the number of nodes requesting bandwidth, this latency may reduce device performance. In an exemplary scenario, the reservation request may be sent wirelessly from the MoCA slave node 220 to the MoCA network controller 200 using a WLAN protocol, such as any 802.11x protocol. The WLAN may be utilized to overcome the latency of the wired network by providing a low-latency path for reservation requests. The WLAN, or any other low-latency network PHY, may be utilized to provide a side channel for requesting a MoCA bandwidth reservation.

In an exemplary scenario, the reservation request may be sent in parallel, via the WLAN protocol and the standard MoCA channel. As discussed above, such redundant reservation requests may be identified by the MoCA slave node 220 as redundant requests (e.g., flagged, numbered, timestamped, etc.). Also, as discussed above, the MoCA slave node 220 may receive a response to the reservation request via the wireless and/or wired network. Additionally, as discussed above, the MoCA slave node 220 may wait to receive a subsequent MAP message indicating the allocated bandwidth and/or may receive a wireless message indicating available bandwidth that the MoCA slave node 220 may utilize before receiving a subsequent MAP message.

While FIG. 2B shows MoCA and WLAN communications protocols, any network protocol may be applicable, where the MoCA network controller 200 and the MoCA slave node 220 have the capability to communicate via and/or knowledge of two or more communications protocols. The integration of two or more protocols in the network device enables the communication of reservation requests in a lower-latency protocol when desired.

Additionally, in a scenario involving premises-based (e.g., home-based) communication networks, the total bandwidth utilized is generally within the control of premises-based devices. For example, communication via a MoCA network is controlled by home-based devices, and communication via a WLAN network is also controlled by home-based devices. Such an operational situation (unlike utilization of public networks) advantageously allows for enhanced optimization of communication bandwidth utilization (e.g., because adverse impacts of unpredictable public utilization of communication bandwidth are generally absent).

Figure 3:
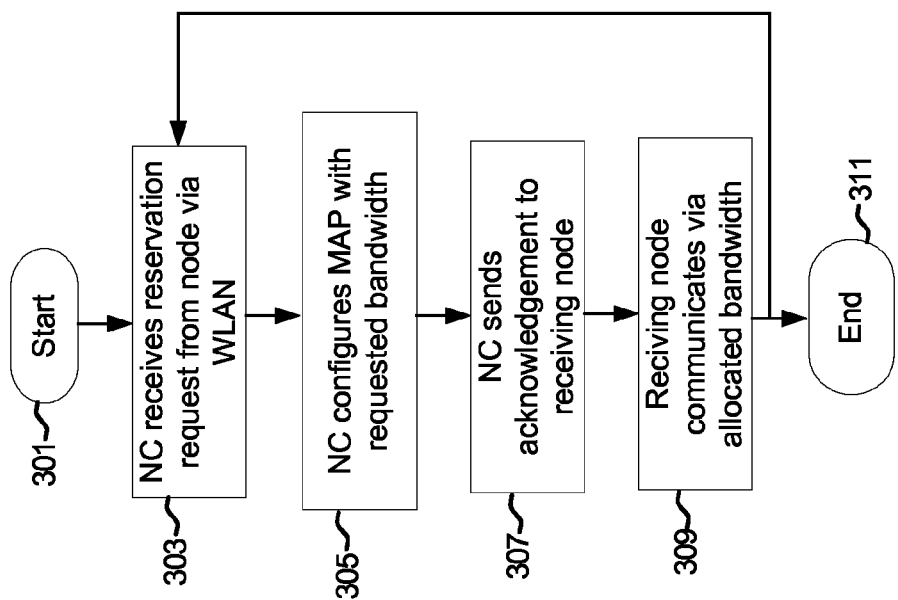
FIG. 3 is a block diagram illustrating exemplary steps in reducing bandwidth acquisition latency for a network controller, in accordance with an embodiment of the invention.

FIG. 3 is a block diagram illustrating exemplary steps in reducing bandwidth acquisition latency for a network controller, in accordance with an embodiment of the invention. The exemplary method illustrated in FIG. 3 may, for example, share any or all functional aspects discussed previously with regard to FIGS. 1, 2A, and 2B (e.g., with regard to a network controller of such figures). Referring to FIG. 3, after start step 301, in step 303, the MoCA network controller 200 may receive reservation requests from one or more nodes (e.g., via a premises-based wireless LAN).

In step 305, the MoCA network controller 200 may generate a MAP with the requested bandwidth allocated to the requesting node or nodes. Step 305 may, for example and without limitation, share any or all functional aspects discussed previously (e.g., with regard to FIGS. 1, 2A, and 2B).

In step 307, the network controller may send an acknowledgement to the requesting node or nodes (e.g., via a wireless and/or wired network). This may allow requesting nodes to obtain a desired channel for communication sooner, due to the reduced latency of the alternate means of communicating the request (e.g., WLAN).

In step 309, the requesting node or nodes may communicate data over the allocated channel or channels as configured by the network controller 200, followed by end step, or the process may loop back to step 303 if further communications are to occur.

Figure 4:
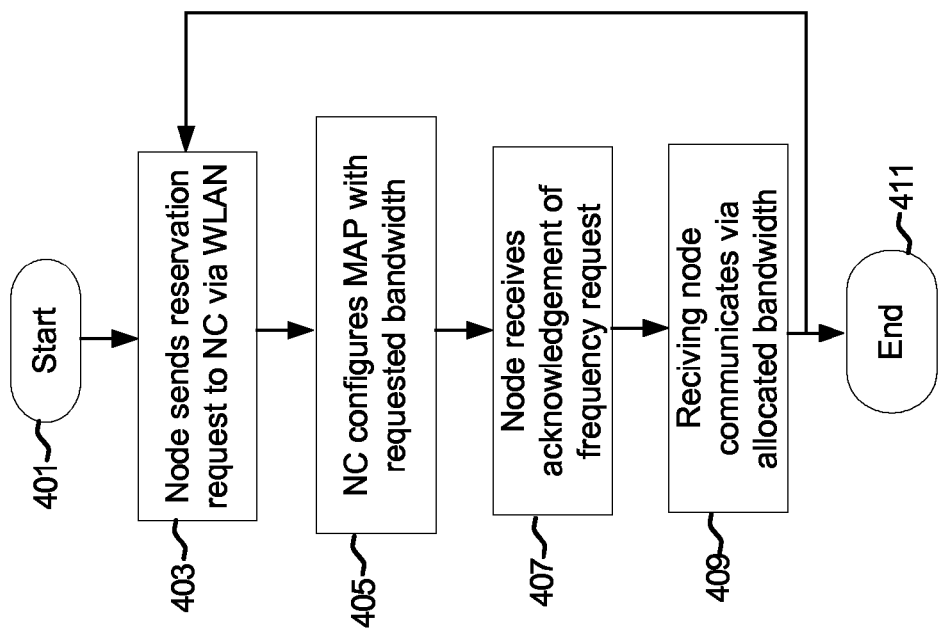
FIG. 4 is a block diagram illustrating exemplary steps in reducing bandwidth acquisition latency for a requesting communication node, in accordance with an embodiment of the invention.

FIG. 4 is a block diagram illustrating exemplary steps in reducing bandwidth acquisition latency for a requesting communication node, in accordance with an embodiment of the invention. The exemplary method illustrated in FIG. 4 may, for example, share any or all functional aspects discussed previously with regard to FIGS. 1-3 (e.g., with regard to any general node of such figures). Referring to FIG. 4, after start step 401, in step 403, the slave network node 220 and/or the other MoCA/LAN nodes 215 may communicate a bandwidth reservation request via a WLAN to the MoCA network controller 200.

In step 405, the MoCA network controller 200 may configure a MAP for the next MAP cycle with the requested bandwidth allocated to the requesting node or nodes. Step 405 may, for example and without limitation, share any or all functional aspects discussed previously (e.g., with regard to FIGS. 1-3).

In step 407, the slave network node 220 may receive acknowledgement of its reservation request (e.g., via wireless network and/or wired network) and may also receive confirmation that it will be allocated the requested bandwidth in the subsequent MAP cycle.

In step 409, the requesting slave network node 220 and/or the other MoCA/LAN nodes 215 may communicate data over the allocated channel or channels as configured by the network controller 200, followed by end step, or the process may loop back to step 403 if further communications are to occur.

In an embodiment of the invention, a method and system may comprise communicating a reservation request for bandwidth allocation for one or more devices 213, 215, 220 operating under a wired network communication protocol on a wired network 101A-101D, 107, 200, 213, 215, 220, where the reservation request may be sent by one or more requesting wired network devices via a wireless network protocol over a wireless network 101A-101D, 109A, 109B, 200, 205, 207, 213, 215, 220. Bandwidth may be allocated in the wired network 101A-101D, 107, 200, 213, 215, 220 for the one or more requesting wired network devices 213, 215, 220 by a network controller 200 for the wired network 101A-101D, 107, 200, 213, 215, 220.

Data may be communicated with the one or more requesting wired network devices 213, 215, 220 via the wired network communication protocol on the wired network 101A-101D, 107, 200, 213, 215, 220. The wired network communication protocol may comprise a multimedia over cable alliance (MoCA) standard. The wireless network communication protocol may comprise an IEEE 802.11x standard, a Bluetooth standard, and/or any non-public wireless network protocol.

The communication of the reservation request via the wireless network communication protocol may decrease a latency of the wired network 101A-101D, 107, 200, 213, 215, 220. The communicated data may comprise multimedia data. A medium access plan (MAP) may be generated by the network controller 200 based on the wirelessly communicated reservation request. The MAP may comprise a bandwidth allocation for the one or more requesting wired network devices 101A-101D, 213, 215, 220. The network controller 200 may comprise wireless network and wired network capability.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing reduced bandwidth acquisition latency.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for multimedia communication, the method comprising:
   in a multi-protocol premises-based communication network comprising a wired network operating in accordance with a wired network communication protocol comprising a multimedia over cable alliance (MoCA) standard and a wireless network operating in accordance with a wireless network communication protocol comprising an IEEE 802.11x standard that comprises one or more of 802.11a, 802.11b, 802.11g, 802.11n, and 802.11ac:
      communicating, over the wireless network operating in accordance with said IEEE 802.11x standard, a reservation request for wired network bandwidth;
      communicating over the wired network operating in accordance with said MoCA standard, a second reservation request for bandwidth on the wired network, where the reservation request and the second reservation request are redundant and wherein said communicating a reservation request over the wireless network decreases a latency of being allocated bandwidth on said wired network relative to a reservation request for bandwidth communicated over the wired network;
      receiving, via the wireless network, an allocation of wired network bandwidth; and communicating, over only the wired network, using the received allocation of wired network bandwidth.

2. The method according to claim 1, wherein said wireless network is a non-public wireless network.

3. The method according to claim 1, wherein said receiving an allocation of bandwidth on the wired network comprises receiving a message describing the allocation of bandwidth.

4. The method according to claim 3, wherein said message comprises a medium access plan (MAP) generated by a network controller of the wired network based on said wirelessly communicated reservation request.

5. The method according to claim 4, wherein said MAP comprises bandwidth allocation information for a plurality of wired network devices.

6. The method according to claim 1, wherein said communicating a reservation request comprises communicating the reservation request to a network controller of the wired network, said network controller comprising wireless network and wired network capability.

7. A system for multimedia communication, the system comprising:
one or more circuits for use in a multi-protocol premises-based communication network comprising a wired network operating in accordance with a wired network communication protocol comprising a multimedia over cable alliance (MoCA) standard and a wireless network operating in accordance with a wireless network communication protocol comprising an IEEE 802.11x standard that comprises one or more of 802.11a, 802.11b, 802.11q, 802.11n, and 802.11 ac, said one or more circuits being operable to:
communicate, over the wireless network operating in accordance with said 802.11x standard, a reservation request for wired network bandwidth;
communicate over the wired network operating in accordance with said MoCA standard, a second reservation request for bandwidth on the wired network, where the reservation request and the second reservation request are redundant and wherein said communicating a reservation request over the wireless network decreases a latency of being allocated bandwidth on said wired network relative to a reservation request for bandwidth communicated over the wired network;
receive, via the wireless network, an allocation of wired network bandwidth; and
communicate, over only the wired network, using the received allocation of wired network bandwidth.

8. The system according to claim 7, wherein said wireless network is a non-public wireless network.

9. The system according to claim 7, wherein said receiving an allocation of bandwidth on the wired network comprises receiving a message describing the allocation of bandwidth.

10. The system according to claim 9, wherein said message comprises a medium access plan (MAP) generated by a network controller of the wired network based on said wirelessly communicated reservation request.

11. The system according to claim 10, wherein said MAP comprises bandwidth allocation information for a plurality of wired network devices.

12. A system multimedia communication, the system comprising:
a multimedia over cable alliance (MoCA) network controller that is operable to:
receive a reservation request for bandwidth allocation for one or more devices operating under a wired network communication protocol comprising a multimedia over cable alliance (MoCA) standard on said wired network, said reservation request received from said one or more requesting wired network devices via a wireless network protocol comprising an IEEE 802.11x standard that comprises one or more of 802.11a, 802.11b, 802.11g, 802.11n, and 802.11ac over a wireless network;
receive over the wired network, a second reservation request for bandwidth on the wired network operating in accordance with said MoCA standard, where the reservation request and the second reservation request are redundant and;
allocate bandwidth in said wired network for said one or more requesting wired network devices, wherein said receiving a reservation request over the wireless network operating in accordance with said IEEE 802.11x standard decreases a latency of said allocating bandwidth on said wired network for said one or more requesting wired network devices relative to a reservation request for bandwidth communicated over the wired network; and
communicate data with said one or more requesting wired network devices via said wired network communication protocol on said wired network.

\* \* \* \* \*